US010191363B2

(12) United States Patent
Hirata et al.

(10) Patent No.: US 10,191,363 B2
(45) Date of Patent: Jan. 29, 2019

(54) PROJECTION-TYPE IMAGE DISPLAY DEVICE

(75) Inventors: Koji Hirata, Ibaraki (JP); Miyuki Ikeda, Ibaraki (JP); Tatsuya Ishikawa, Ibaraki (JP); Hiroyuki Shinji, Ibaraki (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 14/377,302

(22) PCT Filed: Feb. 9, 2012

(86) PCT No.: PCT/JP2012/052992
§ 371 (c)(1),
(2), (4) Date: Aug. 7, 2014

(87) PCT Pub. No.: WO2013/118279
PCT Pub. Date: Aug. 15, 2013

(65) Prior Publication Data
US 2015/0002829 A1   Jan. 1, 2015

(51) Int. Cl.
  *G03B 21/54*   (2006.01)
  *G03B 21/14*   (2006.01)
(52) U.S. Cl.
  CPC ............. *G03B 21/54* (2013.01); *G03B 21/14* (2013.01); *G03B 21/145* (2013.01)
(58) Field of Classification Search
  CPC ....... G03B 21/00; G03B 21/14; H04N 9/3161
  USPC ......................................................... 353/85
  See application file for complete search history.

(56) References Cited

U.S. PATENT DOCUMENTS

| 5,829,855 | A | * | 11/1998 | Uchiyama | ............... | G03B 21/10 |
| | | | | | | 348/E5.141 |
| 2008/0013053 | A1 | * | 1/2008 | Anson | ................... | G03B 21/14 |
| | | | | | | 353/69 |
| 2009/0067275 | A1 | * | 3/2009 | Yasuda | ................... | H04N 5/63 |
| | | | | | | 365/228 |
| 2012/0113398 | A1 | * | 5/2012 | Terauchi | ............... | G03B 21/14 |
| | | | | | | 353/85 |

FOREIGN PATENT DOCUMENTS

| JP | 9-154228 A | 6/1997 |
| JP | 2003-280088 A | 10/2003 |
| JP | 2005-107216 A | 4/2005 |

(Continued)

*Primary Examiner* — Steven H Whitesell Gordon
*Assistant Examiner* — Jerry Brooks
(74) *Attorney, Agent, or Firm* — Baker Botts L.L.P.

(57) ABSTRACT

Provided is a projection-type image display device which by means of a projection lens (2) magnifies and projects an optical image formed by a light source and an image display element, wherein an error indicator (5) for indicating anomalies in the device is disposed on the rear surface opposite the front surface of a device housing (1) to which the projection lens (2) is attached. The projection-type image display device further includes an AC voltage monitor unit (12) for monitoring voltage waveforms supplied form an external power source and retaining voltage waveform data during the latest prescribed period in a memory, and reads out the voltage waveform data from the external power source retained in the memory and displays the voltage waveform data on the error indicator (5) as said anomalies.

6 Claims, 3 Drawing Sheets

(56) References Cited

FOREIGN PATENT DOCUMENTS

| JP | 2005-107276 A | | 4/2005 | |
|---|---|---|---|---|
| JP | 2007047387 | * | 9/2005 | ............ G03B 21/00 |
| JP | 2006-71929 A | | 3/2006 | |
| JP | 2006-267181 A | | 10/2006 | |
| JP | 2010-220069 A | | 9/2010 | |

* cited by examiner

EXAMPLE OF VOLTAGE WAVEFORM DATA

| DATA NO. | AT NORMAL | AT INSTANTANEOUS INTERRUPTION |
|---|---|---|
| 1 | 100 | 100 |
| 2 | 101 | 10 |
| 3 | 100 | 0 |
| 4 | 102 | 0 |
| 5 | 100 | 10 |
| 6 | 101 | 101 |
| 7 | 100 | 100 |
| 8 | 102 | 102 |
| 9 | 101 | 101 |
| 10 | 100 | 100 |

VOLTAGE VALUE MEANS AVERAGE PEAK VOLTAGE OF 100

PROJECTION-TYPE IMAGE DISPLAY DEVICE

TECHNICAL FIELD

The present invention relates to a projection-type image display device having a function of displaying the occurrence of an error.

BACKGROUND ART

A projection-type image display device (projector) uses a liquid crystal panel or the like to optically modulate light emitted from a light source and uses a projection lens to magnify an image and display the image on a screen. The device further uses a light source lamp for emitting high-intensity light and includes a fan located at an appropriate position. The fan is configured to cool the inside of the device so that the temperature of the inside of the device will not be increased to a high temperature due to heat generated by the lamp. The device has therein a temperature sensor and a rotation sensor for the fan, detects an abnormality such as a rise in the temperature, displays an error at the time of the occurrence of the error, and informs a user of the occurrence.

For example, Patent Document 1 discloses an image display device that displays, in a part of a projected image, information of the occurrence of an error of the inside of the device upon detection of the abnormality and causes a device operation display unit to display details of the error.

CITATION LIST

Patent Literature

Patent Document 1: JP-2005-107276-A

SUMMARY OF INVENTION

Technical Problem

In Patent Document 1, a trouble including a rise in the temperature of the device is treated as the detail of the occurrence of the error and can be detected on the basis of a temperature sensor and a rotation sensor. Another trouble is exemplified by an operation of the device that may have stopped due to an abnormality of an external power source. For example, if the external power source is instantaneously interrupted or a voltage becomes low enough, a safety circuit that is provided in the device and configured to protect a lamp operates to interrupt supply of power to the device. However, even if the operation of the device is stopped, the stop may be caused by a failure of the device, other than the abnormality of the external power source. In such a case, a user cannot appropriately determine whether the stop is caused by the error of the external power source or the failure of the device, and the user cannot appropriately handle the trouble or the stop of the device.

An object of the invention is to provide a projection-type image display device that displays a latest voltage status of an external power source when an operation of the device is stopped.

Solution to Problem

According to the invention, a projection-type image display device, which is configured to cause a projection lens to magnify and project an optical image formed by a light source and an image display element, includes an error display unit configured to display details of an error of the device and attached to a back surface located on a side opposite to a front surface that is included in a device housing and to which the projection lens is attached.

In addition, the projection-type image display device is configured to include an AC voltage monitor configured to monitor a voltage waveform supplied from an external power source and store voltage waveform data for a latest certain time period in a memory. As the details of the abnormality, the data stored in the memory and representing the voltage waveform supplied from the external power source is configured to be read and displayed on the error display unit.

Advantageous Effects of Invention

According to the invention, it is possible to easily determine whether or not the stop of an operation of the device is posed by an error of the external power source and appropriately handle a trouble or the stop of the device.

DESCRIPTION OF EMBODIMENTS

Figure 1A:
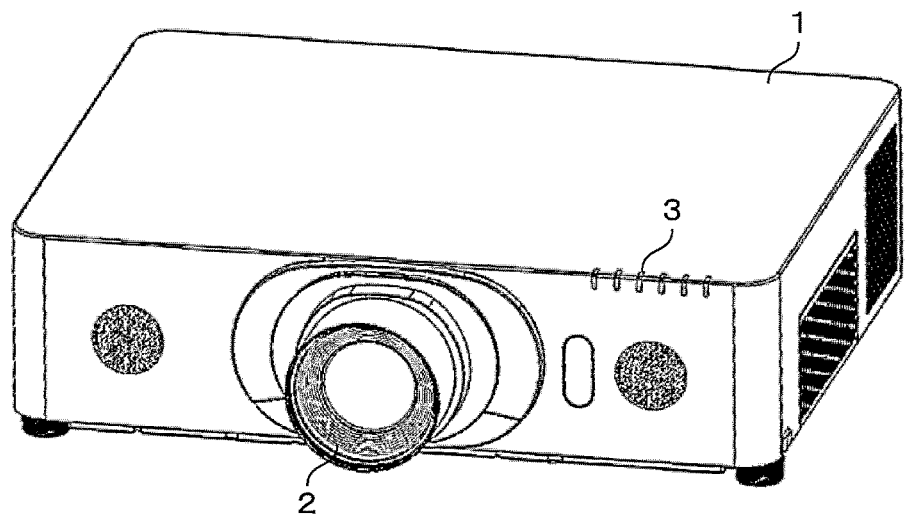
FIG. 1A is a diagram illustrating an outer structure (on the side of a front surface) of a projection-type image display device according to an embodiment.
Figure 1B:
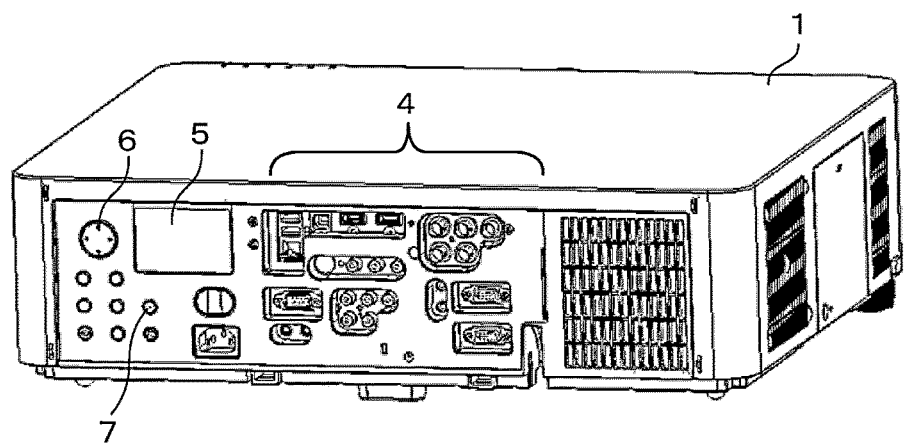
FIG. 1B is a diagram illustrating an outer structure (on the side of a back surface) of the projection-type image display device according to the embodiment.

Hereinafter, an embodiment of the invention is described with reference to the accompanying drawings. FIGS. 1A and 1B are diagrams illustrating outer structures of a projection-type image display device (projector) according to the embodiment. FIG. 1A illustrates the projection-type image display device viewed from the side of a front surface, while FIG. 1B illustrates the projection-type image display device viewed from the side of a back surface. The projection-type image display device is housed in a cuboid device housing 1. A projection lens 2 and an indicator 3 are attached to the front surface of the projection-type image display device, while input and output signal terminals 4, an error display unit 5, operational buttons 6 and 7, and the like are attached to the back surface of the projection-type image display device. The projection-type image display device has therein a light source lamp (not illustrated), an image display element such as a liquid crystal panel, a cooling unit (fan), a temperature sensor configured to monitor an abnormality, and a rotation sensor provided for the fan and configured to monitor the error, which are controlled by a control circuit.

The projection lens 2 magnifies an optical image formed by the image display element and projects the optical image on a screen. The indicator 3 turns on and off a plurality of light emitting diodes (LEDs) and displays ON and OFF status of a power source, a temperature of the inside of the device, and an error of the lamp. The input and output terminals 4, connected to other image equipment, a personal computer, and the like, receive and output an image signal and a control signal. The error display unit 5 is a typical part according to the embodiment and displays the occurrences of various abnormalities within the device using messages. The operational buttons 6 and 7 are used to switch details displayed on the error display unit 5.

Figures 2, 3:
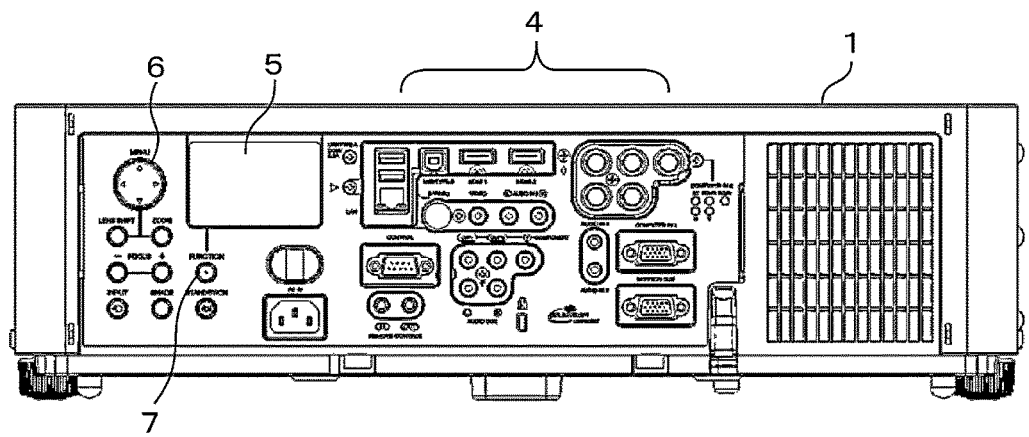
FIG. 2 is an enlarged view of the back surface of the projection-type image display device.
FIG. 3 is a diagram illustrating an example of error messages to be displayed on an error display unit.

FIG. 2 is an enlarged view of the back surface of the projection-type image display device. The error display unit 5 includes a liquid crystal monitor and displays an error of the device and an alarm message. By pressing the operational buttons (menu button 6 and function keys 7), displayed details can be switched and past data can be read. When an operation of the device is in normal status, a backlight of the display unit 5 is turned off and the display unit 5 displays a black screen (or does not display anything). Upon the occurrence of an error, the backlight is turned on, a message is displayed, and the backlight is flashed on and off so as to call user's attention to the occurrence of the error.

In the embodiment, the error display unit 5 is arranged on the back surface (on the side opposite to the projection lens) of the display housing 1 and informs only an operator of the device of a displayed message. Meanwhile, the message is hard to be seen by a person who views a screen image but does not need to know the message.

The projection-type image display device according to the embodiment can be not only installed on a table but also hung from a ceiling. The device is accordingly usable in various manners of installation. For example, when the projection-type image display device is hung from a ceiling, a vertical orientation (upper and lower surfaces) of the device may be reversed, and upper and lower sides of an image projected from the projection lens 2 to a screen are reversed. To avoid this, a gravity sensor that is included in the device detects a position (in a direction of gravitational force) of the installed device. Once the device determines that upper and lower sides of the position of the installed device are reversed, the device reverses upper and lower sides of an image signal to be input to the image display element so as to project, on a screen, the image that is not turned upside down.

Displaying on the display unit 5 is controlled in the same manner as described above. Specifically, if the upper and lower sides of the position of the device are reversed as a result of detection by the gravity sensor, upper and lower sides of a message signal to be displayed on the display unit 5 are reversed. As a result, a vertical orientation of an image to be displayed on a screen and a vertical orientation of a screen displayed on the display unit 5 are controlled in a coordinated manner, whereby a message can be displayed at an appropriate position on the display unit 5 regardless of the position of the installed device.

FIG. 3 is a diagram illustrating an example of error messages to be displayed on the error display unit 5. Types of errors indicated by the messages are described as the following. "LAMP" indicates a failure of lighting of the light source lamp. "COVER" indicates displacement of a lamp cover. "FAN" indicates a failure or stop of a rotation of the fan. "TEMP" indicates an abnormal value (high-temperature value) of a temperature of the inside of the device. "AIR" indicates a deficiency of the volume of cooling air or the stop of the cooling air. "COLD" indicates an abnormal value (low-temperature value) of a temperature of the inside of the device. "FILTER" indicates that a filter needs to be exchanged or cleaned. Those error messages can be switched to detailed data by selecting an operational button. The detailed data includes a period of time for the use of the lamp, a temperature of the inside of the device, a period of time for the use of the filter, and other information are displayed. At the same time, not only present data but also past error data can be displayed. As another function, power supply voltage data can be displayed as described later.

In addition, a switching unit for automatically switching between the error messages may be provided. For example, when the projection-type image display device is placed on a table, a distance between the user and the projection-type image display device is small and thus the projection-type image display device may be set so that detailed data is displayed. If the projection-type image display device is hung from a ceiling, a distance between the user and the projection-type image display device is large, and thus the projection-type image display device may be set so that only a type of an error is displayed in an enlarged manner. Specifically, by automatically switching between the displaying methods suitable for the installation status, the device can effectively inform the user of an error.

Although the error messages and the error data are displayed on the error display unit 5, the error data can be extracted to be transmitted from the input and output signal terminals 4 through RS-232C to an external personal computer, and displayed on the external personal computer.

As a function of displaying an error, a function of displaying a latest status of an external power supply voltage when an operation of the device is stopped will next be described.

Figures 4, 5:
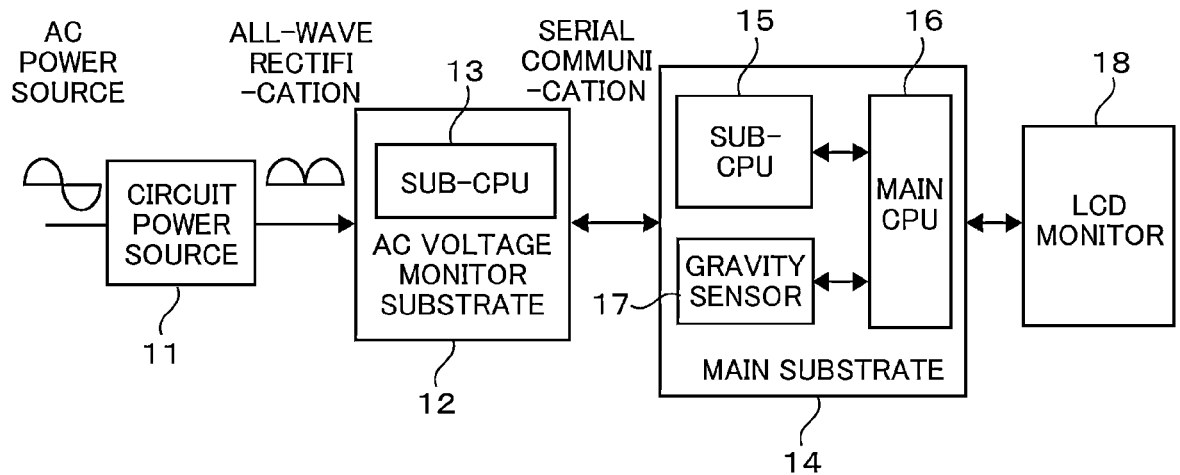
FIG. 4 is a block diagram illustrating a circuit structure for monitoring an AC voltage.
FIG. 5 is a diagram illustrating an example of voltage waveform data at the time of interruption of power supply.

FIG. 4 is a block diagram illustrating a circuit structure for monitoring an AC voltage. AC power supplied to the projection-type image display device is subjected to full-wave rectification through a circuit power source 11 to be input to an AC voltage monitor substrate 12. A sub-microcomputer (sub CPU) 13 that is arranged on the AC voltage monitor substrate 12 monitors an AC voltage waveform and stores waveform data for a latest predetermined time period. A main microcomputer (main CPU) 16 that is arranged on a main substrate 14 transmits display data (including a message) to a liquid crystal monitor (LCD monitor) 18 and controls displaying of the data. At the time of the occurrence of an error (such as the stop of an operation of the device), the main CPU 16 requests the voltage waveform data through the sub-microcomputer (sub CPU) 15 to the sub CPU 13 arranged on the AC voltage monitor substrate 12. The sub CPU 13 transmits the waveform data stored in a memory. The transmitted waveform data is then displayed on the LCD monitor 18 (display unit 5). A gravity sensor 17 that is arranged on the main substrate 14 detects a direction of gravitational force, and the main CPU 16 determines the position of the installed device on the basis of the detected direction of gravitational force and changes an orientation (vertical direction) of a screen displayed on the LCD monitor 18.

An operation of monitoring an AC voltage (or monitoring a waveform) according to the embodiment is described below. A voltage waveform signal subjected to the full-wave rectification by the circuit power source 11 is subjected to AD conversion, and 10 data items are sampled at each interval of 1 millisecond and stored in a ring buffer of the sub CPU 13. In this case, the sampled data items are data items for a half cycle (of 10 milliseconds) of a commercial power source frequency of 50 Hz. Next, an average value of top three data items among the data items stored in the ring buffer is calculated and treated as an input voltage value for the half cycle, for example. An input voltage value calculated for each half cycle (of 10 milliseconds) in the aforementioned manner is stored in the buffer for a latest certain time period. For example, it will be sufficient if 10 input voltage values be stored in order to cover a latest time period (for 5 cycles of a 50-Hz signal) of 100 milliseconds. A time period (of 100 milliseconds in this case) in which data items are stored, and the number of the data items, may be set on the basis of a period of time for predicted interruption (instantaneous interruption).

FIG. 5 is a diagram illustrating an example of voltage waveform data at the time of interruption of power supply. As described above, voltage data is an input voltage value (average value of to three data items) for each half cycle of 10 milliseconds. The voltage value is an average value of peak values separately calculated and is standardized. In this example, as a power supply error, interruption (instantaneous interruption) of power supply occurs for a time period of 40 milliseconds.

Once an operation of the device stops after which the power source is recovered, a safety circuit for protecting the lamp starts running to have the device continue to be in a halt state. After a predetermined time elapses, the safety circuit is released and the device is reactivated. The user thereafter operates the operational buttons 6 and 7 so as to cause the main CPU 16 to request voltage waveform data to the sub CPU 13. The sub CPU 13 reads the latest voltage waveform data stored in the buffer and transmits the voltage waveform data to the main CPU 16. The transmitted waveform data is displayed on the LCD monitor 18 (or the display unit 5). The user analyzes the voltage waveform data displayed on the display unit 5 and can thereby determine whether the stop of the device has been posed by an error of an external power source or a failure of the device. The devices with a conventional structure does not have a voltage status of the external power source immediately before the stop of the device not stored. For this reason, it was difficult to clarify the cause of the stop of the device. According to the embodiment, it is possible to easily clarify the cause of the stop of the device by way of a latest voltage waveform and appropriately handle a trouble or the stop of the device.

REFERENCE SIGNS LIST

1 . . . Housing
2 . . . Projection lens
3 . . . Indicator
4 . . . Input and output signal terminals
5 . . . Error display unit
6, 7 . . . Operational buttons
11 . . . Circuit power source
12 . . . AC voltage monitor substrate
13 . . . Sub-microcomputer (sub PCU)
14 . . . Main substrate
15 . . . Sub-microcomputer (sub PCU)
16 . . . Main microcomputer (main CPU)
17 . . . Gravity sensor
18 . . . Liquid crystal monitor (LCD monitor)

The invention claimed is:

1. A projection-type image display apparatus comprising: a projection lens configured to magnify and project an optical image formed by a light source and an image display element, and a back surface side display configured to display a detail of an error of the projection-type image display apparatus and is attached to a back surface located opposite to a front surface of a housing of the projection-type image display apparatus to which the projection lens is attached, wherein a backlight of the back surface side display is configured to be turned off when an operation of the projection-type image display apparatus is in normal status and the backlight of the back surface side display is configured to be turned on when an error has occurred in the operation of the projection-type image display apparatus, wherein both a displayed content about the error displayed on the back surface side display and a method for displaying the error on the back surface side display are changed by a controller based on an installed orientation of the projection-type image display apparatus among a plurality of installed orientations including an installed orientation for being hung from a ceiling and an installed orientation for being placed on a table, wherein when an installed orientation of the projection-type image display apparatus is the installed orientation for being placed on a table, the back surface side display displays a detailed data about the error, in order for the detailed data to be viewed by a user at smaller distance away from the projection-type image display apparatus placed on a table than a user for the projection-type image display apparatus hung from a ceiling, and wherein when an installed orientation of the projection-type image display apparatus is the installed orientation for being hung from a ceiling, the back surface side display displays a type of the error in an enlarged manner, in order for the type of the error displayed in enlarged manner to be viewed by a user at more large distance away from the projection-type image display apparatus hung from a ceiling than a user for the projection-type image display apparatus placed on a table.

2. The projection-type image display apparatus according to claim 1, further comprising an AC voltage monitor configured to monitor a voltage waveform supplied from an external power source and to store voltage waveform data for a latest certain time period in a memory, wherein the data stored in the memory and representing the voltage waveform supplied from the external power source is read by the controller as the detail of the error and displayed on the back surface side display.

3. The projection-type image display apparatus according to claim 1, further comprising a gravity sensor configured to detect an installation position of the projection-type image display apparatus, wherein a vertical orientation of a signal to be displayed on the back surface side display is changed by the controller in accordance with the installation position of the projection-type image display apparatus that has been detected.

4. The projection-type image display apparatus according to claim 1, wherein the backlight of the back surface side display is flashed on and off after the error has occurred in the operation of the projection-type image display apparatus.

5. The projection-type image display apparatus according to claim 1, further comprising an operational input unit which switches the details displayed in the back surface side display.

6. The projection-type image display apparatus according to claim 5, wherein the details displayed in the back surface side display are switched to the details about past error data by operation through the operational input unit.

* * * * *